United States Patent [19]
Vogel

[11] Patent Number: 5,114,165
[45] Date of Patent: May 19, 1992

[54] STORABLE WHEELED CARGO CARRIER

[76] Inventor: Monty D. Vogel, 157 Hearthside Rd., Standish, Me. 04084

[21] Appl. No.: 636,717

[22] Filed: Jan. 2, 1991

[51] Int. Cl.$^5$ .............................................. B62B 1/10
[52] U.S. Cl. ............................. 280/47.331; 280/204; 280/414.2; 280/47.26
[58] Field of Search ............. 280/47.331, 47.26, 414.2, 280/204, 47.33; 114/344

[56] References Cited

U.S. PATENT DOCUMENTS

| | | | |
|---|---|---|---|
| 4,413,835 | 11/1983 | Hazelett | 280/204 |
| 4,544,172 | 10/1985 | Poulouin | 280/47.331 |
| 4,712,803 | 12/1987 | Garcia | 280/47.331 |
| 4,795,178 | 1/1989 | Nabarrete | 280/47.331 |
| 4,822,065 | 4/1989 | Enders | 280/47.331 |
| 4,936,595 | 6/1990 | Cunningham | 280/47.331 |

FOREIGN PATENT DOCUMENTS 8002245  11/1981  Netherlands ................... 280/47.331

Primary Examiner—David M. Mitchell
Attorney, Agent, or Firm—Thomas L. Bohan

[57] ABSTRACT

A wheeled storage box/cargo carrier used to transport small watercraft of the type including sailboards, canoes, and small sailboats comprising a storage container and detachable components. The carrier of the present invention may be pulled by hand, and a bicycle towing clamp enables the user to pull the carrier by bicycle. Large semi-pneumatic wheels permit the user to maneuver the carrier in locations that are otherwise inaccessible by motorized vehicles, such as through soft sand and over rough terrain. All of the components of the carrier are detachable and may be stored within said storage container. The storage container, in turn, is storable within or upon the watercraft. Most of the components of the present invention are fabricated of plastic or non-ferrous metals to reduce the detrimental effects of corrosion.

10 Claims, 5 Drawing Sheets

STORABLE WHEELED CARGO CARRIER

BACKGROUND OF THE INVENTION

1. Field of the Invention

This invention relates to an apparatus for transporting sailboards, canoes and small sailboats, by hand or bicycle, to locations that are otherwise inaccessible. More particularly, this invention relates to an apparatus for hand- or bicycle-transportation wherein the means of supporting such watercraft includes a storage container and wheels with high ground-clearance.

2. Description of the Prior Art

Recreational sailing and canoeing have been, and continue to be, popular sports both for the individual and for groups of people. In the field of small watercraft, i.e., sailboards, canoes, and small sailboats, one of the primary obstacles that must be overcome in order to enjoy the sport involves getting the craft into the water. When a water landing is readily accessible by car or truck, or the craft is very small, the obstacle is not a particularly difficult one. However, when the craft is to be placed in water that is not readily accessible, and/or the craft is difficult for one person to handle, then getting the craft to the water becomes the central issue. Dragging the craft by hand can be extremely strenuous, in addition to being potentially ruinous to the vessel itself. To overcome this particular transportation problem, a number of devices have been developed.

The devices that have been developed generally consist of two wheels on a single axle, and a support component for the craft. These devices also have some type of means, such as belts or straps, to secure the craft while it is being transported. The prior art devices can be split into two categories—(1) the type suitable for use behind a motorized vehicle, and (2) the type suitable for use in relatively inaccessible locations—i.e., locations that can only be reached by foot or bicycle. The present invention is of the latter type, i.e., the type that has been designed such that the user provides the pulling force—either by bicycle or by hand.

A major concern in the use of wheeled carrier devices is what to do with the carrier itself once the user has reached a desired location. Many of the commercially available devices are not easily stored, and since they are generally wider than the craft they are supporting, they must be left behind when the craft is placed in the water. A disclosure by Garcia (U.S. Pat. No. 4,712,803) notes this problem with other devices and attempts to solve it by providing a collapsible device. In particular, Garcia describes a collapsible sailboard dolly that may be stored in a car. A patent to Enders (U.S. Pat. No. 4,822,065) also addresses the storage problem for a cargo carrier that is specially designed for carrying boats. Specifically, Enders discloses a triangularly-shaped carrier with a removable handle, wherein the cargo support is collapsible for easy storage. The disclosures of Garcia and Enders teach easier storage of their carriers but they fail to address the particular problem of what to do when the user wants to bring the carrier either in or on the watercraft.

In addition to this primary concern, there are other problems with the commercially-available carriers, as well as with the carriers disclosed by Garcia and Enders, that the present invention addresses. First, the prior art devices for hard-to-reach locations tend to be limited in that they must be pulled by hand—see for example the patent issued to Cunningham (U.S. Pat. No. 4,936,595). The devices suitable for transportation behind a vehicle are much more massive than the type addressed by the present invention. Such devices are fine when the location is readily accessible, but many desirable locations are far removed from the roadways. On the other hand, bicycles, which can reach fairly inaccessible areas, have not been discussed as an alternative means of pulling the carriers previously disclosed. This can, however, be an important mode of transportation, particularly when the distance to be covered is considerable and is inaccessible to motorized vehicles.

Another concern—related to the type of craft to be transported—involves the use of the mast of the craft as a support beam for the body of the craft. Although a patent issued to Poulouin (U.S. Pat. No. 4,544,172) discloses the use of the mast as a support member for a sailboard carrier, Poulouin is specifically limited to the transportation of that type of device only. In particular, Poulouin discloses that the mast *and* the wishbone of the sailboard must be used to support the body of the board. That support would be unavailable if the craft were a sailboat. That particular device would not enable the user to support the body of the craft if the mast were unavailable.

It can be seen from the above discussion that the prior art devices are limited in that each must be used for a particular type of watercraft—either for a sailboard, or for a sailboat, or for a canoe. However, because there are many boating enthusiasts who own more than one type of craft, it would be most efficient to have a carrier suitable for use with a multiplicity of watercraft types, wherein that carrier would also comprise all of the useful attributes of the prior art devices. Such attributes include: (1) large-diameter, semi-pneumatic tires for use in soft sand and over difficult terrain; (2) operation by a single individual; and (3) collapsibility of the entire device for ease of storage.

Still another concern—one that faces all boating enthusiasts—is the general problem of corrosion. Any corrodible metal that is exposed to water is subject to the detrimental effects of corrosion. Many available carriers comprise parts fabricated from such metals. In order to extend the life of the carrier, the user must protect the surfaces of such metals. This is generally done by coating the surfaces with paint. However, it is in the nature of these carriers that the paint is quickly worn away and the metal surface is once again exposed to a corrosive environment. For this reason the user must be vigilant in protecting the corrodible metal surfaces of the carrier—a time-consuming and undesirable situation.

Therefore, what is needed is a carrier which is suitable for the transportation of any one of a number of types of small watercraft and which also: (1) may be maneuvered in soft sand and over difficult terrain; (2) may be maneuvered by a single individual; and (3) is collapsible for ease of storage. What is also needed is a carrier that is configured for transportation by bicycle, and that is still lightweight enough to be maneuvered by hand. Further, what is needed is a carrier that is not only collapsible for easy storage, but that may be stored within or upon the craft. Still further, what is needed is a carrier that provides structural support to the transported watercraft, wherein that structural member provides storage for the carrier as well as storage for items to be carried in or on the watercraft. Additionally, what is needed is a carrier made substantially from non-corrodible components.

It is therefore an object of the present invention to provide an apparatus for carrying watercraft, wherein the apparatus is capable of supporting and transporting any of a number of types of small watercraft to locations that are otherwise inaccessible to motorized vehicles.

It is another object of the present invention to provide an apparatus for carrying watercraft, wherein the apparatus is maneuverable by a single individual, either through soft sand or over rough terrain, and that may be pulled either by hand or by bicycle.

It is still another object of the present invention to provide an apparatus for carrying watercraft, wherein the apparatus is easy to collapse into a storable configuration, and that may be stored in or on the watercraft that it is transporting.

It is still a further object of the present invention to provide an apparatus for carrying watercraft, wherein the apparatus is comprised substantially entirely of non-corrodible components.

SUMMARY OF THE INVENTION

The present invention overcomes the deficiencies associated with the variety of prior art carrying devices by combining a non-corrodible storage container with readily-detachable, non-corrodible components to make a carrying device which is collapsible and storable, and which is capable of supporting the load of any of several types of small watercraft. The storage container is sized so that the other components of the carrying apparatus are storable within it. In addition, there is enough remaining storage space that other items may be placed within the container along with the carrier components. The container's size is limited so that it can be stored within or on the watercraft being transported. This provides the user with the convenient option of taking the entire carrying apparatus on a trip.

The storage container, which also acts as the primary structural support member, is detachably affixed to two high ground-clearance wheels which are used to maneuver the watercraft. The wheels are sized: (1) to permit the carrier to be operated in soft sand and over rough terrain; and (2) to fit within the container. The wheels, and the axle connecting them, are all fabricated either from plastic or non-corrodible metal.

Detachably affixed to the lid of the storage container are two load supporting racks. These racks may be made of impact-resistant plastic, and are configured so as to cradle a variety of watercraft shapes. This cradle configuration enables the present invention to support several types of watercraft, ranging in shapes from sailboards and small sailboats to canoes. Resilient pads, affixed to the craft-contacting surfaces of the racks, provide load-cushioning, as well as frictional-resistance, to undesirable movement of the craft while it is being transported. The mast or oars of the watercraft may be inserted into holes drilled into the faces of these racks, thereby providing longitudinal support to the craft, and providing the user with a handle to pull the carrying apparatus. Friction-fit grommets are affixed to the inside diameter of the holes to prevent the oars or mast from slipping out while the craft is in transit.

If neither the oars nor the mast are to be used to pull the carrying apparatus of the present invention, a handle is provided as the pulling means. This handle is sized and shaped to be ergonomically efficient. The handle provides the user with the option of using either means to pull the carrying apparatus by hand. If the user wishes to pull the apparatus by bicycle, a pivoting, semi-flexible, corrosion-resistant towing clamp, one end of which is detachably affixed either to the mast, an oar, or the handle and the other end of which is adjustably affixed to a bicycle frame.

Further features of the carrying apparatus of the present invention that illustrate its usefulness include: (1) a kickstand fitted to the bottom portion of the apparatus to stabilize the carrier as the user loads and unloads the watercraft; (2) components made of corrosion-resistant materials to relieve the user of the obligation of periodically monitoring the apparatus for the detrimental effects of corrosion; (3) one or more securing straps to retain the watercraft on the support racks while the watercraft is in transit; and (4) a selection of components that provides maximum load-bearing capability at the lightest possible carrier weight.

Further advantages of the carrying apparatus of the present invention will become apparent to those skilled in the art upon review of the following specification, drawings, and claims.

DETAILED DESCRIPTION OF THE PREFERRED EMBODIMENT

Figure 1:
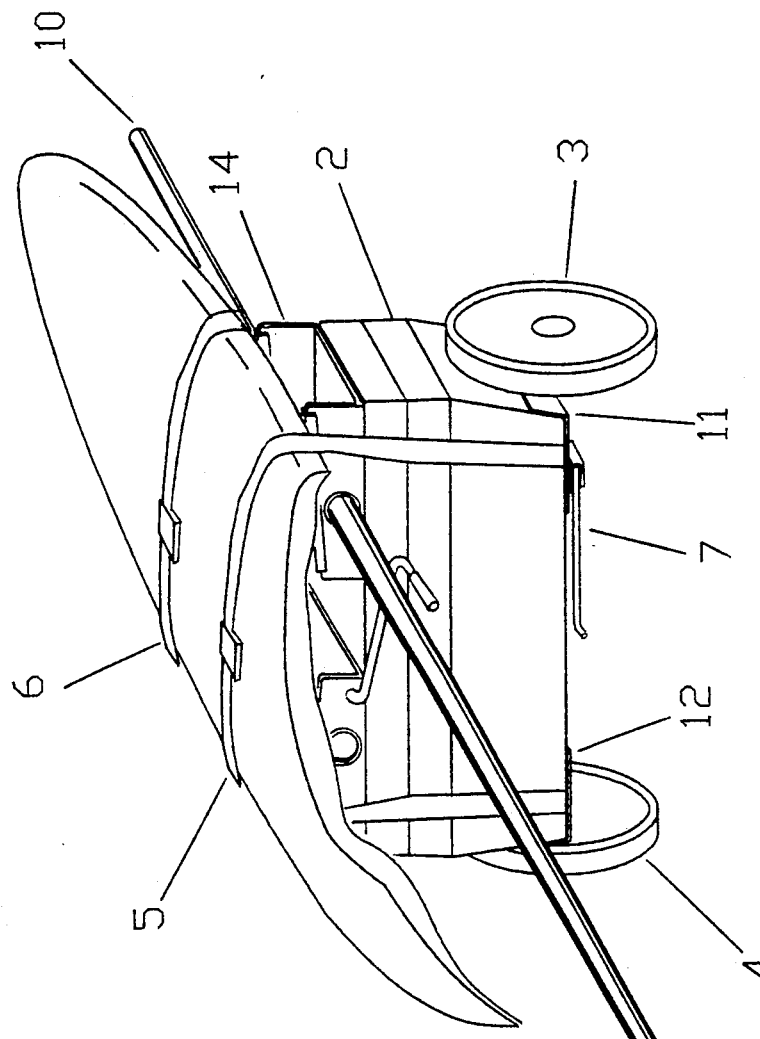
FIG. 1 is a perspective view of the carrier of the present invention, shown with a cutaway view of a mounted sailboard.

As illustrated in FIG. 1, cargo-carrying apparatus 1 of the present invention comprises a storage container 2, first wheel 3 and second wheel 4, a first retaining strap 5 and a second retaining strap 6, a kickstand 7, and an optional bicycle towing clamp 8. Although said cargo-carrying apparatus 1 is shown supporting a sailboard 9 with a single mast 10 in FIG. 1, it should be realized that other other types of watercraft—such as small sailboats and canoes—are also supportable by said carrying apparatus 1.

Figure 3:
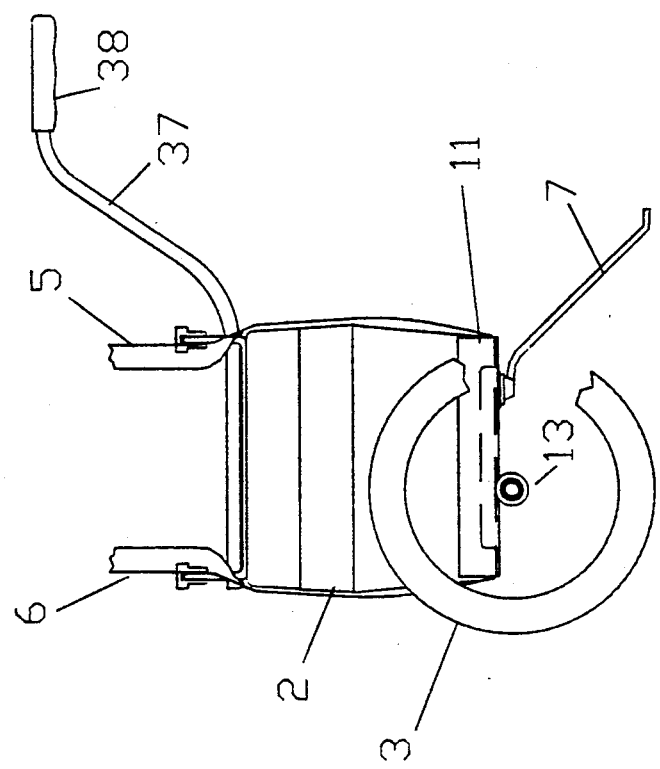
FIG. 3 is a side elevation view of the present invention.
Figure 2:
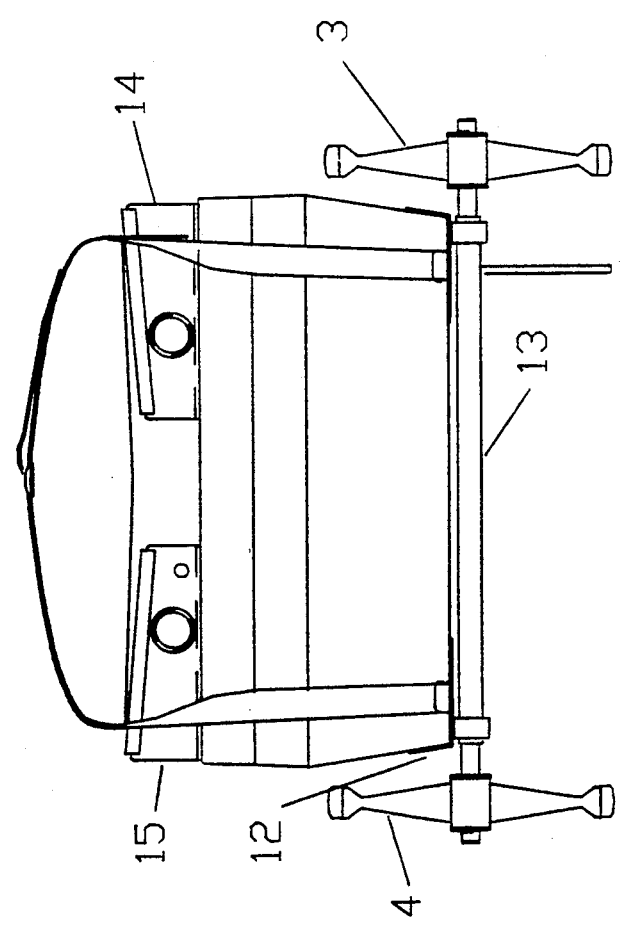
FIG. 2 is a rear elevation view of the present invention.
Figure 4:
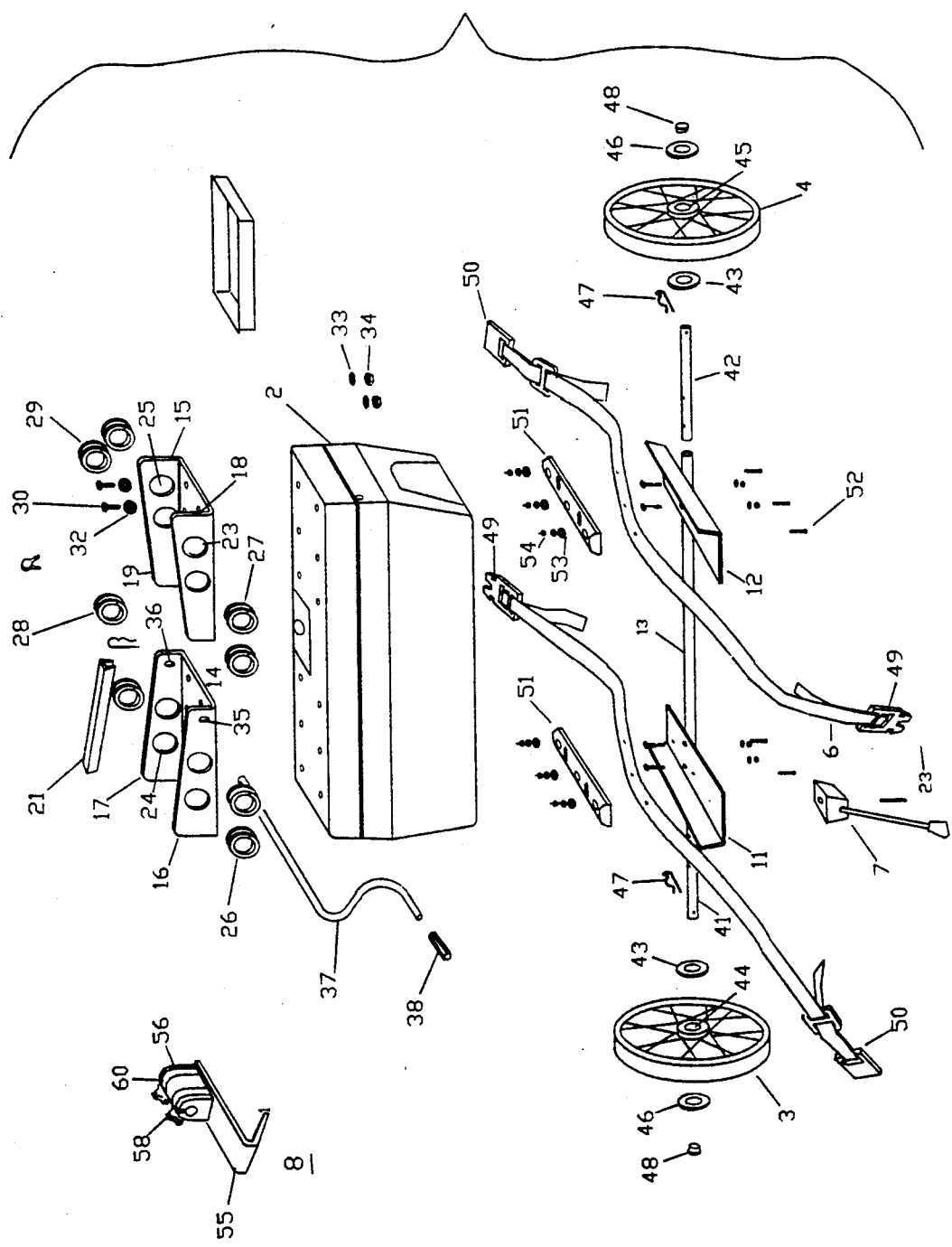
FIG. 4 is an exploded view of the present invention.

A unique feature of the present invention is the utilization of said storage container 2 as the support means for the craft to be transported. In particular, said storage container 2 not only provides support for the watercraft, but is of such dimensions that all other components of said carrying apparatus 1 can be stored within it. Said storage container 2 is preferably a DELTA HOPPER, a 3.8 cubic foot lockable polyethylene storage box manufactured and distributed by Delta Consolidated Industries of Jonesboro, Ark. As illustrated in FIGS. 2–4, a bottom of said storage container 2 is detachably affixed, with four internal 90-degree latches, to a first support fixture 11 and a second support fixture 12, wherein each of said support fixtures 11 and 12 comprises one horizontal surface and two vertical legs. A rotatable carrier axle 13 runs perpendicular to, and extends through, centered holes of both vertical legs of each of said support fixtures 11 and 12. A first end of said carrier axle 13 is, in turn, detachably affixed to said first wheel 3 and a second end of said carrier axle 13 is detachably affixed to said second wheel 4. In the preferred embodiment, said support fixtures 11 and 12 are both made of 2"×4" aluminum channel and said carrier axle 13 is 1" inside-diameter aluminum pipe.

As illustrated in FIG. 4, said wheels 3 and 4, which in the preferred embodiment are santoprene/polypropylene 16" diameter semi-pneumatic wheels, are affixed to said carrier axle 13 by a first axle tube 41 and a second axle tube 42. Specifically, said axle tubes 41 and 42 are 1" outside-diameter aluminum tubing, and are inserted into opposite ends of said carrier axle 13. Inside wheel washers 43 are placed on said axle tubes 41 and 42, and then said tubes are placed into hubs 44 and 45 of said wheels 3 and 4. The assembly is maintained in position by outside wheel washers 46, stainless steel hairpin cotters 47, and wheel endcaps 48, all of which enables the user to easily remove said wheels 3 and 4 and said tubes 41 and 42.

As illustrated in FIG. 4 and the other FIGS. a first support rack 14 and a second support rack 15 are detachably affixed to a container lid 16 of said storage container 2. In the preferred embodiment of the present invention, said support racks 14 and 15 are affixed to said storage container 2 by means of non-corroding flathead screws 30, countersunk washers 32, lock washers 33 and nuts 34. Said sailboard 9 rests on top of said support racks 14 and 15, and said support racks 14 and 15 are cut at an angle of 3+ degrees, so as to form a cradle-like structure, and so that said sailboard 9 is supported equally by each of said racks 14 and 15. In the preferred embodiment, said support racks 14 and 15 are made by strip heating ⅜" High Density Polyethylene (HDPE) flat sheet, and bending said HDPE sheet to preform a channel of the shape illustrated in FIG. 4. Vertically-oriented sides 16-19 of said preformed channels are then cut to the angle previously indicated. It should be noted that this is but one way of forming said support racks 14 and 15; it would be obvious to one skilled in the art that there are a variety of ways to form these channel-shaped structures.

Additional features of said support racks 14 and 15 that make the present invention unique include frictional cushions 21 placed on each of the uppermost edges of said racks 14 and 15, and front mast holes 22 and 23, and rear mast holes 24 and 25, all of which are located on said vertical faces 16-19 of said support racks 14 and 15. Said frictional cushions 21, which are preferably made of uv-resistant neoprene, come in direct contact with said sailboard 9 and assist said retaining straps 5 and 6 in restraining said sailboard 9 from shifting undesirably as the user travels over rough terrain. Said cushions 21 also reduce gouging of said sailboard 9. Said mast holes 22-25 are used to secure either one or two masts of a sailboard or sailboat, or the oars of a canoe, during transporation. Each of said mast holes 22-25 is lined with frictional bushings 26-29, which are preferably made of uv-resistant neoprene, wherein said bushings 26-29 prevent unwanted movement of said masts or said oars. Said front mast holes 22 and 23 are located slightly closer to a centerline of said carrying apparatus 1 than are the corresponding rear mast holes 24 and 25. This asymmetry enables the user to angle said mast 10 (or masts or canoes) slightly toward the centerline such that said carrying apparatus 1 may be centered behind the person or vehicle pulling said carrying apparatus 1.

As illustrated in FIG. 4, handle holes 35 and 36, which are drilled through said vertical faces 16 and 17 of said support rack 14, respectively, are positioned to the inside of, and slightly below the centerline of, said mast holes 22 and 24. Said handle holes 35 and 36 are designed to accept a handle 37 in the event that said carrying apparatus 1 is to be moved by hand and there are no masts or oars to grip. In the preferred embodiment said handle 37 is ⅞" diameter aluminum tube, is bent to provide the most ergonomically efficient positioning, and further comprises a molded handle grip 38. The use of a handle alone for pulling a craft affixed to said carrying apparatus 1, indicates that said storage container 2 provides enough support that supplemental support, such as the mast itself, is not required.

Said kickstand 7, which balances the load of the watercraft when the user is stopped, is detachably affixed to an underside of said first support fixture 11, and as illustrated in FIG. 3, it extends beyond said wheels 3 and 4 and said storage container 2. In the preferred embodiment, said retaining straps 5 and 6 are 10' long and 1¼ wide, made of polypropylene, and comprise delrin adjustable grips 49 and web grips 50. As illustrated in FIG. 4, said retaining straps 5 and 6 are detachably affixed between box mounts 51 and said support fixtures 11 and 12 by means of strap screws 52, strap washers 53 and strap nuts 54.

Figure 5:
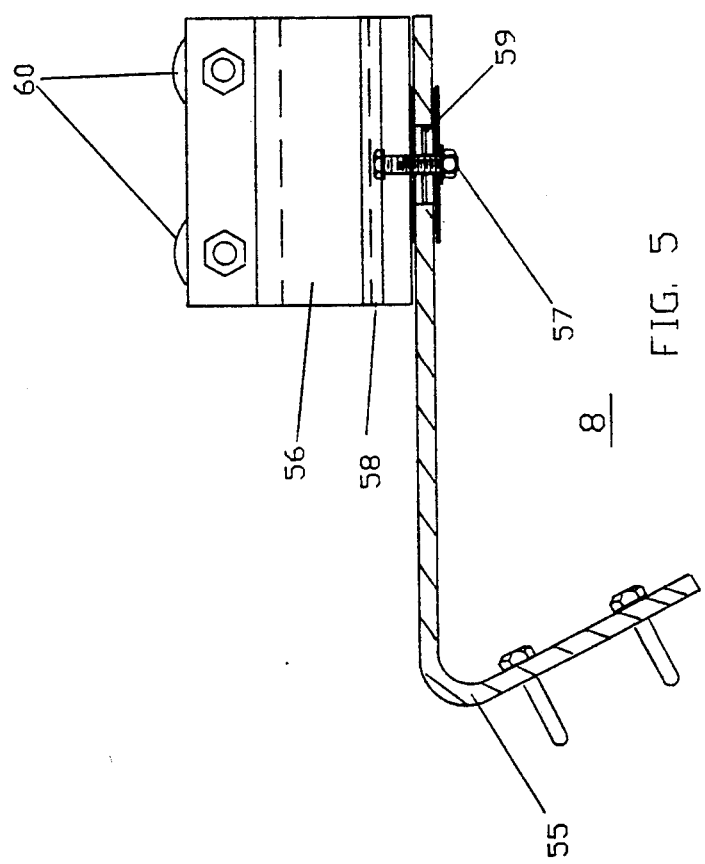
FIG. 5 is a side view of the bicycle towing clamp of the present invention.
Figure 6:
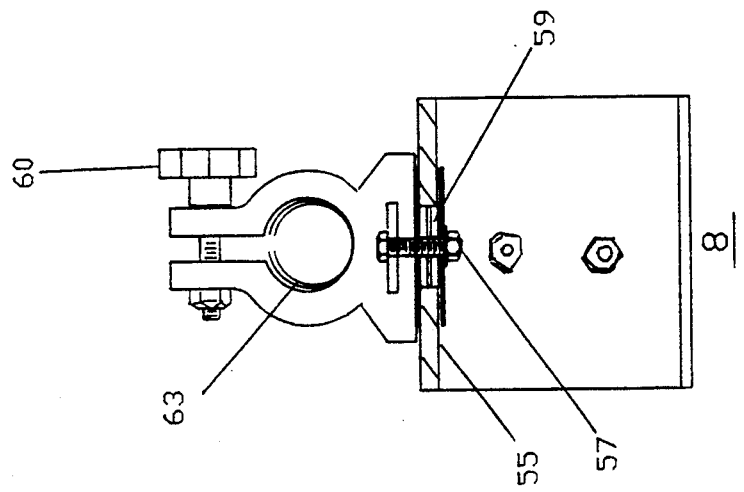
FIG. 6 is an end view of the bicycle towing clamp of the present invention.

An additional feature that is unique to the present invention is said optional variety of designed to adapt to a variety of bicycle frames and as illustrated in FIGS. 1 and 4, said towing clamp 8 may be affixed either to said craft mast 10 or to said handle 37. In the preferred embodiment illustrated in FIGS. 5 and 6, said towing clamp 8 comprises a hitch base 55 affixed to a bicycle frame 61 below a bicycle seat 62, and a frictional towing tube 56. Said hitch base 55 is fabricated from a ¼"×3" HDPE sheet which is molded into an angled form, as shown in the FIGS. Said towing tube 56, which may be made of uv-resistant neoprene, is mounted on a top, rear end of said hitch base 55 by means of a ⅜" hex head screw 57. Said towing tube 56 also comprises a ¼"×⅛" slot adjacent to said hitch base 55 to incorporate an aluminum plate 58 which makes said clamp 8 stiffer, and which spreads the load placed on said hitch base 55. A hitch bushing 59 affixed to said towing tube 56 enables said towing tube 56 to freely swivel on said hitch base 55. Two threaded knobs 60 located on the top of said towing tube 56 permit said towing tube 56 to form varying eccentric circles 63 in order to accommodate a variety of mast diameters. Said threaded knobs 60 also secure said mast 10 or said handle 37 within said towing tube 56, regardless of a variation in the diameter of the item to be inserted.

Although the preferred embodiment of the present invention has been described, it is to be remembered that the above description is merely illustrative. Components of the invention may be formed in several different ways and those components may be combined in different ways to produce the cargo carrying apparatus of the present invention. Accordingly, it is to be understood that the present invention is not limited to the precisely shown and described herein.

I claim:

1. A storable apparatus for transporting small watercraft of the type including sailboards, canoes, small sailboats, comprising:

a. a storage container, wherein said container comprises a first support rack and a second support rack, wherein each of said support racks comprises a horizontal surface and two vertical legs, wherein said horizontal surfaces of said support racks are detachably affixed to a lid of said container, and wherein said watercraft rests on said vertical legs of said support racks;

b. a first support fixture and a second support fixture, wherein each of said support fixtures comprises a horizontal surface and two vertical legs, and wherein a bottom surface of said storage container is detachably affixed to said horizontal surface of each of said support fixtures;

c. a first retaining strap and a second retaining strap, wherein said first retaining strap is detachably affixed to said first support fixture and said second retaining strap is detachably affixed to said second support fixture, and wherein both of said straps are of sufficient length to surround said watercraft on said support racks;

d. a rotatable carrier axle extending through said vertical legs of each of said support fixtures; and e. a first wheel and a second wheel, wherein said first wheel is detachably affixed to a first end of said carrier axle and said second wheel is detachably affixed to a second end of said carrier axle, wherein said support racks, said support fixtures, said retaining straps, said carrier axle, and said wheels are all removable and storable within said storage container, and wherein said storage container is storable within said watercraft.

2. The storable apparatus as claimed in claim 1 further comprising a kickstand detachably affixed to said first support fixture, wherein said kickstand extends beyond said first and second wheels.

3. The storable apparatus as claimed in claim 1 further comprising a handle for pulling said transportable watercraft by hand or by bicycle, wherein said handle is retained within a handle hole located in said first support rack.

4. The storable apparatus as claimed in claim 1 further comprising a bicycle towing clamp for towing said apparatus behind a bicycle, wherein said towing clamp is pivotable and wherein a towing tube of said towing clamp is detachably affixed to a mast of said watercraft, or to an oar of said watercraft, or to a handle affixed to said first support rack, and a hitch base of said towing clamp is detachably affixed to said bicycle.

5. The storable apparatus as claimed in claim 1 wherein said first support rack and said second support rack each comprises a front mast hole and a rear mast hole, wherein said front mast hole of said first support rack is located closer to a centerline of said storable apparatus than is said rear mast hole of said first support rack, and said front mast hole of said second support rack is located slightly closer to said centerline of said storable apparatus than said rear mast hole of said second support rack, wherein a mast or an oar of said watercraft is fitted into and extends through said mast holes and wherein said mast or said oar extends toward said centerline of said storable apparatus.

6. The storable apparatus as claimed in claim 5 wherein said mast or said oar of said watercraft contained within said mast holes is a handle utilized for pulling or towing said storable apparatus.

7. The storable apparatus as claimed in claim 5 wherein each of said mast holes comprise frictional bushings to secure said mast or said oar within said mast holes.

8. The storable apparatus as claimed in claim 1 wherein said first support rack and said second support rack are cut at a downwardly sloping angle to form a cradle so as to provide support to a variety of types of watercraft.

9. The storable apparatus as claimed in claim 8 wherein frictional cushions are placed on upper edges of said support racks to assist in restraining said watercraft during transportation and to reduce gouging of said watercraft.

10. A storable apparatus for transporting small watercraft of the type including sailboards, canoes, small sailboats, comprising:

a. a storage container, wherein said container comprises a first support rack and a second support rack, wherein each of said support racks comprises a horizontal surface and two vertical legs, wherein said horizontal surfaces of said support racks are detachably affixed to a lid of said container, and wherein said watercraft rests on said vertical legs of said support racks;

b. front mast holes through front vertical legs of said first support rack and said second support rack, and rear masts holes through rear vertical legs of said first support rack and said second support rack, wherein:

i. said front mast holes are located slightly closer to a centerline of said storable apparatus than said rear mast holes;

ii. a mast or an oar of said watercraft is fitted into and extends through said mast holes; and iii. said mast or said oar extends toward said centerline of said storable apparatus, and wherein said mast or said oar is a handle utilized for pulling or towing said storable apparatus;

c. a first support fixture and a second support fixture, wherein each of said support fixtures comprises a horizontal surface and two vertical legs, and wherein a bottom surface of said storage container is detachably affixed to said horizontal surface of each of said support fixtures;

d. a first retaining strap and a second retaining strap, wherein said first retaining strap is detachably affixed to said first support fixture and said second retaining strap is detachably affixed to said second support fixture, and wherein both of said straps are of sufficient length to surround said watercraft resting on said support racks;

e. a rotatable carrier axle extending through centered holes of said vertical legs of said support fixtures;

f. a first wheel and a second wheel, wherein said first wheel is detachably affixed to a first end of said carrier axle and said second wheel is detachably affixed to a second end of said carrier axle; and g. a kickstand detachably affixed to said first support fixture, wherein said kickstand extends beyond said first wheel and said second wheel, wherein said support racks, said support fixtures, said securing straps, said carrier axle, and said wheels are all removable and storable within said storage container, and wherein said storage container is storable within said watercraft.

* * * * *